US005329815A

United States Patent [19]
Dunn et al.

[11] Patent Number: 5,329,815
[45] Date of Patent: Jul. 19, 1994

[54] VIBRATION MONOLITHIC GYROSCOPE

[75] Inventors: William C. Dunn, Mesa; Raymond M. Roop, Scottsdale, both of Ariz.

[73] Assignee: Motorola, Inc., Schaumburg, Ill.

[21] Appl. No.: 810,064

[22] Filed: Dec. 19, 1991

[51] Int. Cl.⁵ .............................................. G01P 9/04
[52] U.S. Cl. .................................................. 73/505
[58] Field of Search ................ 73/505, 510, 517 AV

[56] References Cited
U.S. PATENT DOCUMENTS 4,598,585  7/1986  Boxenhorn ............................ 73/505
4,736,629  4/1988  Cole ................................... 73/517 R
4,884,446 12/1989  Ljung .................................. 73/505

Primary Examiner—John E. Chapman
Attorney, Agent, or Firm—Eugene A. Parsons

[57] ABSTRACT

A vibration gyroscope including a central mounting post and a planar mass symmetrically affixed thereto for vibrational movement. The post and mass are formed from a single layer of semiconductor material deposited on a substrate, such as silicon. Capacitive plates positioned below and above the mass, formed by depositing two additional layers of semiconductor material, are utilized for driving the mass and sensing vibration produced by the Coriolis effect.

15 Claims, 4 Drawing Sheets

VIBRATION MONOLITHIC GYROSCOPE

The present invention pertains to vibrational gyroscopic devices and more specifically to vibrational gyroscopes incorporating improved seismic masses.

BACKGROUND OF THE INVENTION

In the past, gyroscopes and gyroscopic devices were constructed of relatively large and expensive electromagnetic devices. These electromagnetic devices incorporated coils and position sensors mounted for relatively high speed, continuous rotational movement.

Eventually, micromechanical rate gyros were developed which included components formed by semiconductor processing techniques. While these devices are relatively small and utilize vibrational motion rather than continuous rotary motion, they are relatively insensitive and costly to manufacture.

Generally, the micromechanical rate gyros are constructed with a central mass, which because of the size of the gyro is very small and requires some very heavy material such as gold to provide sufficient inertia to meet the sensitivity requirements. The central mass is mounted in a gimbal structure including mutually orthogonal flexible axes, with the mass and gimbal structure generally lying in a common plane. The central mass and inner mounting gimbal are oscillated or vibrated about a first of the orthogonal axes and rotational movement about an axis perpendicular to the common plane produces vibrational movement about the other of the orthogonal axes, due to the Coriolis, or gyroscopic, effect.

The described micromechanical rate gyro has several problems. Specifically, the centrally mounted mass is expensive and difficult to manufacture. Second, the amount of mass is limited by the fact that it is centrally mounted in a planar constructed gimbal system which substantially reduces the momentum of the mass and, therefore, produces a very small torque, or moment, about the driven axis. Also, because of the central mounting of the mass in a gimbal system a greater amount of mass and actual vibratory movement of the mass is required to produce a desired sensitivity.

To further reduce the size, cost and usefulness of rate gyros, there is a need for micromechanical rate gyros with increased sensitivity.

SUMMARY OF THE INVENTION

A purpose of the present invention is to provide vibration gyroscopes with increased sensitivity.

A further purpose of the present invention is to provide vibration gyroscopes which are smaller, less expensive to manufacture and which have a wider dynamic range.

These purposes and others are met by a vibration monolithic gyroscope including a mounting post fixedly attached to a base and defining a first axis, a mass fixedly attached to the post for vibrational movement and positioned in a plane perpendicular to the post, the mass defining second and third axes mutually perpendicular to each other and to the first axis, driving apparatus mounted adjacent to the mass for causing the mass to move in a vibrational motion about the second axis, and sensing apparatus positioned adjacent to the mass for sensing movement about the third axis in response to movement of the gyroscope about the first axis.

BRIEF DESCRIPTION OF THE DRAWINGS

Referring to the drawings.

DESCRIPTION OF THE PREFERRED EMBODIMENTS

Figure 1:
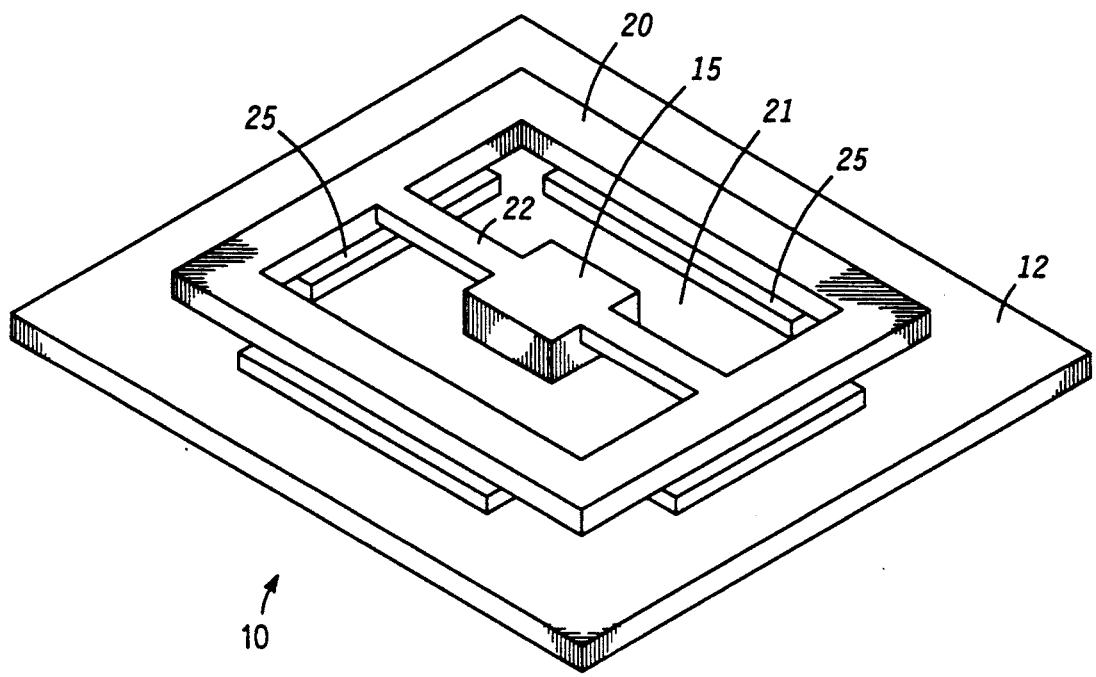
FIG. 1 is a perspective view of a vibration monolithic gyroscope embodying the present invention.

Referring specifically to FIG. 1, a vibration monolithic gyroscope 10 is illustrated, which gyroscope 10 embodies the present invention. Gyroscope 10 includes a semiconductor substrate 12, such as silicon, germanium, gallium arsenide, or the like, with an insulating layer on the surface forming a base for the structure. Substrate 12 has a mounting post 15 fixedly attached thereto. A seismic mass 20 is fixedly attached to post 15 for vibrational movement relative thereto. In this specific embodiment mass 20 is a flat generally rectangular layer of semiconductor material having a central opening 21 and symmetrically positioned about post 15. Mass 20 is fixedly attached to post 15 by means of a plurality of cantilever arms 22, each having one end affixed to post 15 and the other end affixed to the inner edge of mass 20. By affixing the planar mass to a central mounting post via arms 22, the inertial energy of the vibrating mass is greatly increased over prior art gimbal mounted gyroscopes and the effective sensitivity is greatly increased.

A plurality of plates 25 are formed on the surface of substrate 12 parallel to the lower major surface of mass 20 and spaced therefrom. Each of the plates 25 forms a capacitance with mass 20, which capacitance is used for driving the mass in vibratory motion about one axis and/or sensing vibratory motion of the mass about an orthogonal axis. At least some similar plates (not shown) are formed above (in FIG. 2) and spaced from the upper surface of mass 20. While it should be understood that single plates can be utilized for sensing and driving apparatus, plates positioned adjacent to both major surfaces of mass 20 and connected in a push-pull arrangement substantially increase control and sensing capabilities.

In this specific embodiment plates 25 are formed by selectively depositing a first layer of semiconductor material, such as polysilicon, on the planar surface of substrate 12. Post 15, mass 20 and arms 22 are formed from a second common layer of selectively deposited semiconductor material, such as polysilicon. Post 15 is formed as an integral portion of substrate 12. Plates positioned adjacent the upper surface of mass 20 are formed by selectively depositing a third layer of semiconductor material, such as polysilicon or the like. Generally, unless the material forming the upper and lower plates and mass 20 is a conductive material, such as metal, the semiconductor material is heavily doped to produce a relatively good conductor. During processing the separation of plates 25, 20 and 29 is normally set by sacrificial layers of SiO2, which is later removed to allow the structures to become free standing. Other combinations of materials may be devised. It is only necessary to have an appropriate differential etch rate between the conductors (and other components to be released) and the sacrificial layers.

Figure 2:
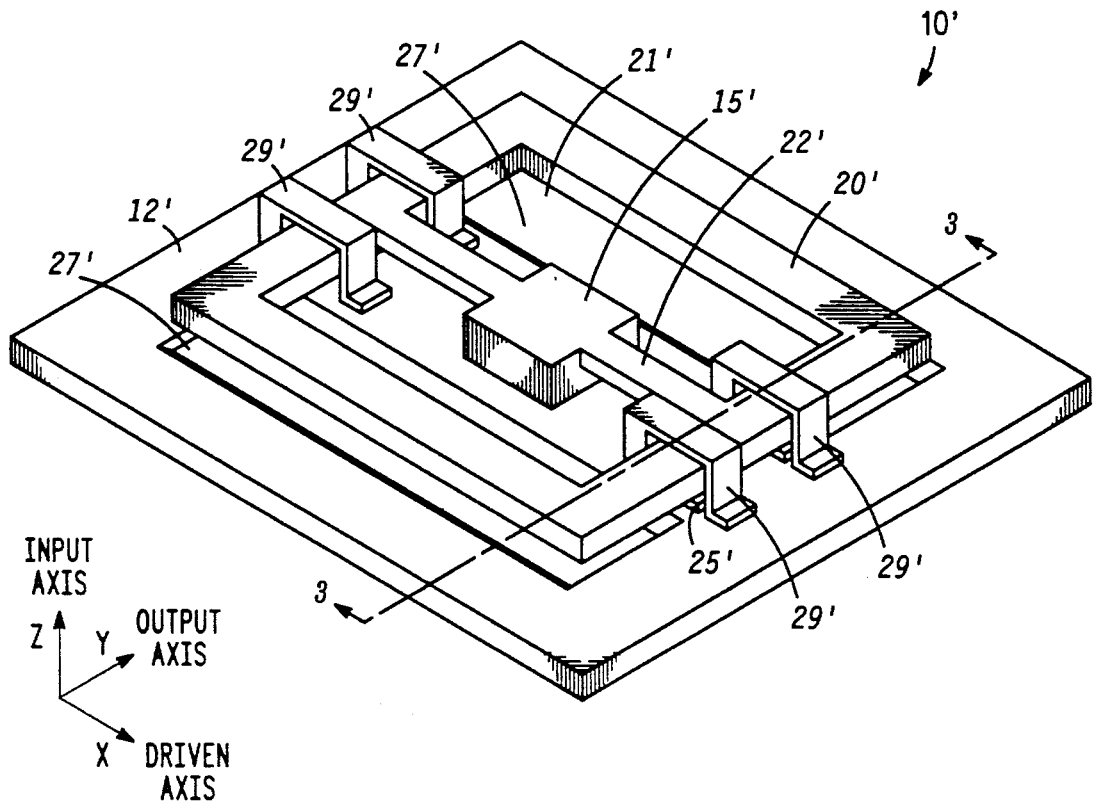
FIG. 2 is another embodiment of a vibration monolithic gyroscope embodying the present invention.
Figure 3:
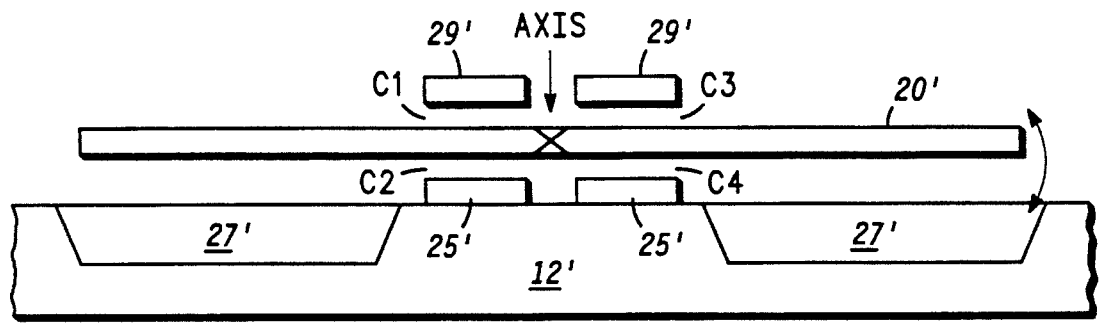
FIG. 3 is a sectional view of the gyroscope of FIG. 2 as seen along the line 3—3.

Referring specifically to FIGS. 2 and 3, an embodiment of a vibration monolithic gyroscope 10', embodying the present invention is illustrated. In this embodiment components similar to components in gyroscope 10 of FIG. 1 are designated with similar numbers and all numbers have a prime added to indicate the different embodiment.

A substrate 12' has a mounting post 15' formed on a planar surface thereof and defining a first axis, which in this specific embodiment is the input axis. A generally rectangularly shaped seismic mass 20' is positioned in parallel spaced apart relationship above the planar surface of substrate 12'. Mass 20' has a central opening 21' therethrough and is further positioned generally symmetrically about post 15'. A pair of cantilever arms 22' are each affixed to post 15', at opposite sides thereof, by one end and the other end of each arm 22' is attached to the inner periphery of mass 20'. Arms 22' define a second axis, orthogonal to the first axis, that in this embodiment is the axis about which gyroscope 10' is driven, or vibrated. A third axis is defined mutually perpendicular to both the first and second axes, which third axis is the output axis. It will of course be understood that arms 22' can be formed as a continuous sheet, or web, of material with appropriate openings therethrough for mounting and/or connecting the various components.

Two pairs of plates 25' are positioned on substrate 12', between substrate 12' and mass 20', one pair being positioned adjacent the outer end of each of the arms 22'. The plates 25' are spaced apart on either side of the second axis and form capacitances C2 and C4 with mass 20' at each end of the second axis. Pits 27' are etched into substrate 12' under mass 20' to extend the distance that mass 20' can move before contacting substrate 12'.

Two pairs of plates 29' are positioned above the upper major surface of mass 20', one pair being positioned adjacent the outer end of each of the arms 22'. The plates 29' are spaced apart on either side of the second axis, generally in overlying relationship to the plates 25', and form capacitances C1 and C3 with mass 20' at each end of the second axis. Plates 29' are formed, for example, by selectively depositing a third semiconductor layer over the second semiconductor layer or by forming a conventional crossover bridge.

Figure 4:
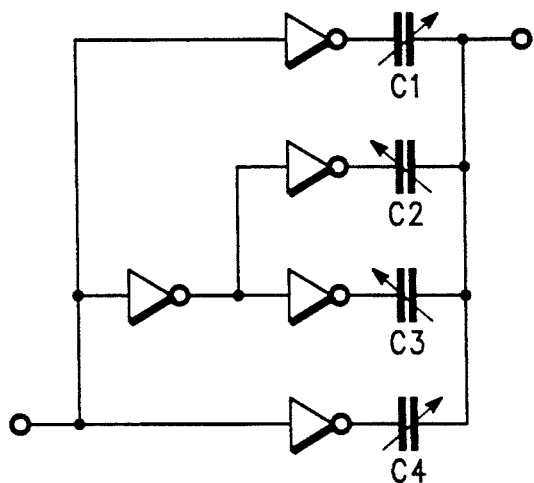
FIG. 4 illustrates a schematic diagram of a drive circuit for the gyroscope of FIG. 3.

Referring to FIG. 4, a schematic diagram of a driving circuit including capacitors C1-C4 is illustrated. In the circuit illustrated, capacitors C1 and C4 are connected to receive an inverted drive signal and capacitors C2 and C3 are connected to receive the drive signal directly (twice inverted for timing and buffering). The drive signal consists of alternating pulses of energy. Since capacitors C1-C4 are connected so that diametrically opposed capacitors have the same signal, mass 20' is vibrated, or oscillated, about the second axis when the alternating pulses are applied to the capacitors.

Figure 5:
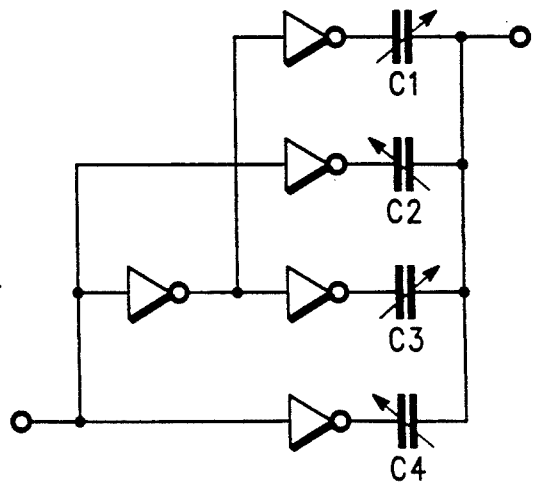
FIG. 5 illustrates a schematic diagram of a centering and sensing circuit for the gyroscope of FIG. 3.

Referring to FIG. 5, a schematic diagram of a centering and sensing circuit including capacitors C1-C4 is illustrated. In the circuit illustrated, capacitors C1 and C3 are connected to receive a centering and/or sensing signal directly (twice inverted for timing and buffering) and capacitors C2 and C4 are connected to receive an inverted centering and/or sensing signal. In this mode of operation, capacitors below mass 20' are connected in parallel and capacitors above mass 20' are connected in parallel. By connecting the capacitors in this fashion there is greater sensing capability and uniform centering force.

In the operation of gyroscope 10', capacitors C1-C4 at each end of mass 20' are time shared in the two modes illustrated in FIGS. 4 and 5. In the first mode capacitors C1-C4 are connected as illustrated in FIG. 4 and a vibratory, or oscillatory, motion is imparted to mass 20' about the second axis, defined by arms 22'. Periodically, capacitors C1-C4 are switched into the sensing mode. If gyroscope 10' is rotated about the first axis, defined by post 15', the Coriolis, or gyroscopic effect, causes vibration of mass 20' about the third axis. This vibration results in substantially equal changes in capacitances C1, C3 and equal changes in capacitances C2, C4 at each end of mass 20'. The changes in the capacitances are sensed and converted to a signal representative of the measured rotation rate of gyroscope 10'. A drive signal, which is generated by the sensed vibration, is then applied to the circuit illustrated in FIG. 5 as a closed loop signal to urge mass 20' toward center.

The maximum force applied to mass 20' by the Coriolis effect is stated as:

$$F = 2m \, w \, Z_A \Omega_Z$$

where:
  m = effective mass,
  w = vibration frequency,
  $Z_A$ = vibration amplitude about first axis, and
  $\Omega_Z$ = rate input Thus, it can be seen that increases in mass, distance of the mass to the rotational axis and vibration amplitude directly increase the force produced by the Coriolis effect. Further, increasing the force increases the sensitivity of the gyroscope.

Figure 6:
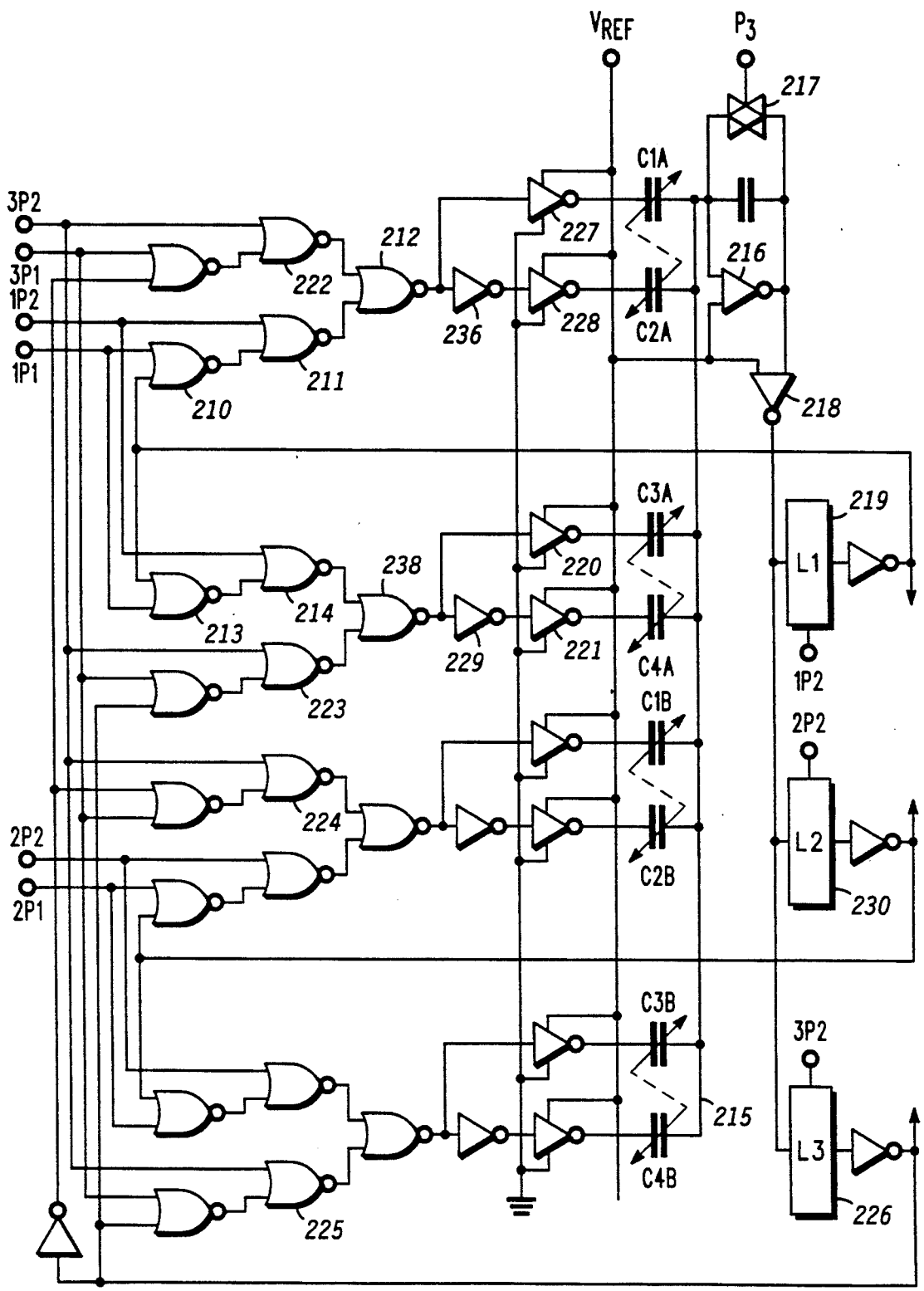
FIG. 6 is a schematic diagram of a sensing and control circuit for the gyroscope illustrated in FIG. 2.
Figure 7:
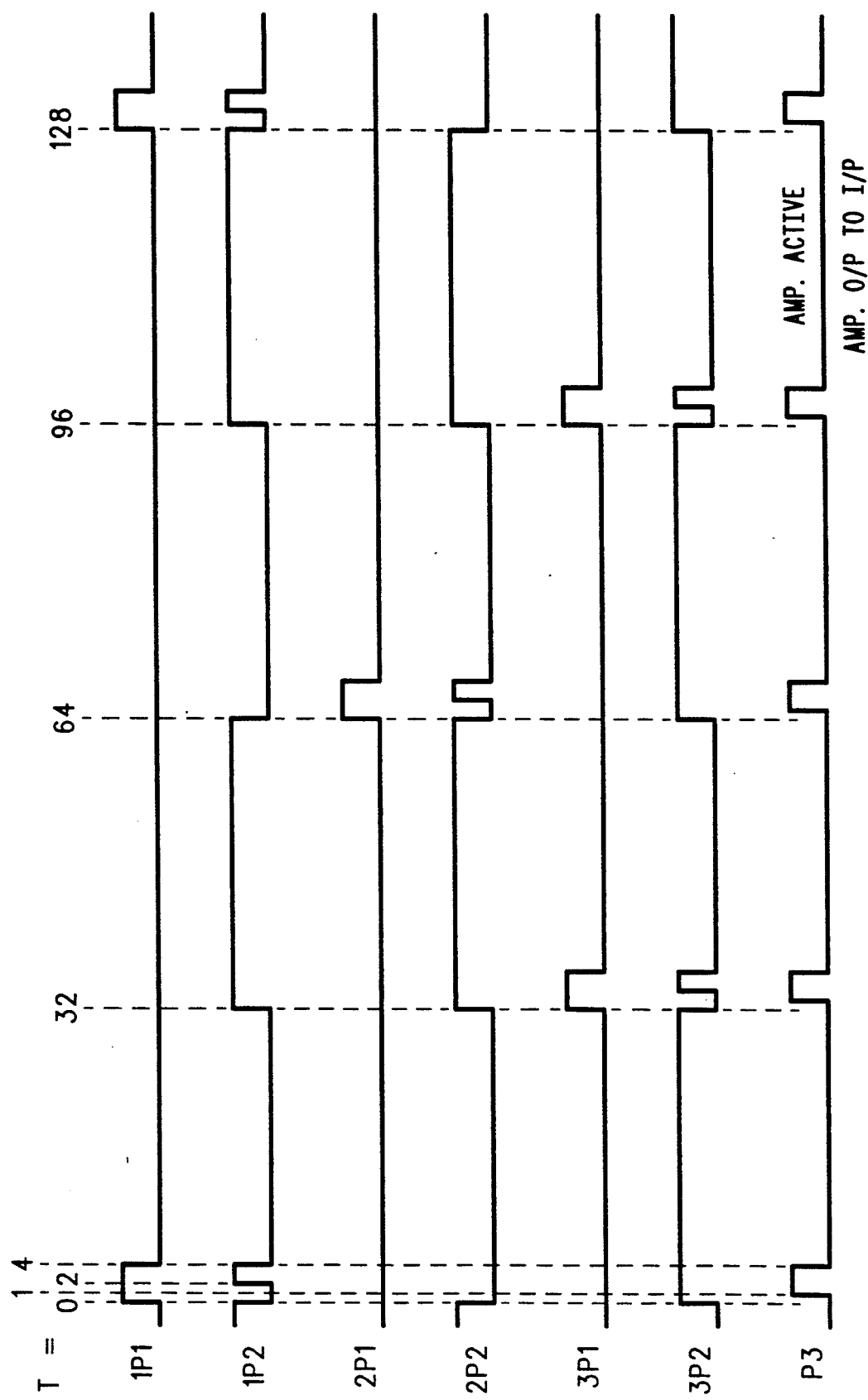
FIG. 7 illustrates waveforms available at various points in the schematic of FIG. 6.

FIG. 6 illustrates a schematic diagram of a sensing and control circuit connected to gyroscope 10' of FIG. 2 and waveforms available at various points therein are illustrated in FIG. 7. For the convenience of describing FIG. 6, the capacitors formed at one end of mass 20' are designated C1A-C4A and the capacitors formed at the other end of mass 20' are designated C1B-C4B. Mass 20', or the central plate of each of the pairs of capacitors is designated node 215 in FIG. 6 with signals being connected to the upper and lower capacitive plates of each of the capacitors via the logic shown. At time T=0 (FIG. 7), the capacitors are switched to the configuration shown in FIG. 5, input terminal 1P1 goes high, forcing VREF voltage on the upper plates of capacitors C1A and C3A and ground potential on the lower plates of capacitors C2A and C4A. The center plate, node 215, is held at $V_{REF}$ by a virtual ground amplifier 216, which has unity gain due to a switch 217 being closed by a low signal on the control input terminal P3 thereof.

At time T=1, P3 is driven high and switch 217 is turned off so that amplifier 216 becomes active as a virtual ground integrating amplifier. At time T=2, input terminal 1P2 is switched from low to high, which forces the voltage on the upper plates of capacitors C1A and C3A to switch from $V_{REF}$ to ground potential and the voltage on the lower plates of capacitors C2A and C4A to switch from ground potential to $V_{REF}$. Any difference in capacitance between C1A+C3A and C2A+C4A results in a charge on node 215 which is amplified, inverted and converted into a voltage by amplifier 216. The output signal of amplifier 216 is further amplified by an amplifier 218. It should be noted that there is no change in the ratio of C1A+C3A to C2A+C4A due to vibration about the X axis.

At time T=4, after the amplifiers have had time to settle, the signal is latched by a latch circuit 219. Latch circuit 219 is a negative edge triggered latch clocked by signals on input terminal 1P2, which latches positive voltage signals as a "high" and negative voltage signals as a "low". The output from latch circuit 219 is fed back via gates 210, 211, 212, 213, 214 and 235 to inverters 236, 227, 228, 229, 220 and 221 which apply VREF and ground potential to the plates of capacitors C1A, C2A, C3A and C4A. By applying $V_{REF}$ and ground potential as described above, the same potential is applied to plates C1A and C3A and the same potential is applied to plates C2A and C4A so that an electrostatic force is produced at the A end of the center plate, mass 20', to pull and hold mass 20' in its central position. The electrostatic force is produced on mass 20' in this section from time T=4 to T=32 and again from T=64 to T=96. The position of mass 20' is again sampled in this section when T=128. At times T=64, 192, etc. capacitors C1B+C3B and C2B+C4B are sampled and during times T=64 to 96 and 128 to 160 the corrective electrostatic force is produced to center mass 20' at the other end (B end) of mass 20'.

Over extended periods of time, up to one second, the time duration of the corrective electrostatic force on the capacitor plates at end A of mass 20' is compared to the corrective electrostatic force at end B of mass 20'. It should be noted that these signals are AC, being modulated by the vibration frequency of mass 20', so that the signals have to be demodulated and then compared. This comparison gives the rate of rotation. Maximum sensitivity is achieved by the close spacing between the sensing plates and the optimized spacing between the sets of capacitors.

In this specific embodiment, oscillation or vibration of mass 20' about the X axis, defined by arms 22', is accomplished as follows. During time periods T=0 to 32, 64 to 96, 128 to 160, etc., the signal on input terminal 3P2, connected to gates 222, 223, 224 and 225 is high. This high signal inhibits signals from latch circuit 226 controlling or driving the capacitor plates and, simultaneously, allows signals from latch circuits 219 and 230 to sense and control mass 20'. During times T=32 to 64, 96 to 128, etc., signals on input terminals 1P2 and 2P2 are high, inhibiting signals from latch circuits 219 and 230 being applied to the capacitors. Thus, during these times the capacitors are driven from latch circuit 226.

During time periods T=32 to 64, 96 to 128, etc. the configuration is electronically switched to that illustrated in FIG. 4, the angular position of mass 20' is sensed at the start of each cycle by measuring the differential capacitance between C1A+C4A+C1B+C4B and C2A+C3A+C2B+C3B. Mass 20' is then driven by electrostatic forces by applying the appropriate voltages to the upper and lower capacitor plates to force the mass into oscillation. For example, rotation about the axis through arms 22' (the X axis) is sensed. Mass 20' is driven in one direction until a predetermined difference in capacitance is sensed, then latch circuit 219 is triggered and the drive voltages on mass 20' are reversed and mass 20' is driven in the opposite direction until a predetermined capacitance is sensed. Using this method of drive, mass 20' is made to oscillate or vibrate about the X axis at the natural resonant frequency of the structure, with a fixed amplitude of oscillation. Consequently, mass 20' is driven at resonance, any Coriolis forces produced by rotation of gyroscope 10' about the Z axis is measured and mass 20' is maintained substantially in its centered position by multiplexing the drive signals to the four pairs of sensing capacitors.

In the present structures, a single mounting post (although multiple mounting posts could be used if desired) is used to mount a planar mass, which greatly increases the effective mass over prior art structures utilizing gimbal mounted masses. Because of the novel configuration of gyroscopes constructed in conformance with the present invention, the effective mass is greatly increased and, therefore, so is the sensitivity. Further, the novel configuration of the mass in the disclosed embodiments allows for simpler, smaller construction and no additional steps, as required in the prior art to provide sufficient mass. It will of course be understood that the structure could also be constructed using bulk micromachining and wafer bonding techniques. Also, by closing the loop to maintain the mass near the zero or neutral position, the dynamic range is substantially increased. Also, relatively simple circuitry is disclosed for oscillating or vibrating the mass of the gyroscope, sensing rotation and maintaining the mass substantially centered.

In addition, novel positioning of the capacitors close to the X axis allows for minimal spacing between the capacitor plates for driving the structure at its natural resonant frequency, whilst maintaining a large amplitude of vibration to improve the sensitivity. The minimal spacing between plates and the optimized positioning of the plates at either extremity of the structure further improves the sensitivity. It is also shown how the same sets of capacitors are used for driving the structure in an oscillatory mode with fixed amplitude and also used for maintaining the vibration mass in its central position using closed loop techniques while further being used to sense the Coriolis forces produced by rotation of the structure. The disclosed structure could also be used to measure acceleration in the Z direction.

The disclosed structure is also designed so that the mass and rotational axis are in the same plane so as to minimize the sensitivity to cross axis forces.

The bridges forming the upper plates are also used as stops to contain the vibrating mass under shock and high acceleration conditions to make a very rugged structure. Thin layers of insulative material over one or both adjacent capacitor plates prevents shorting of the capacitor.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A vibration monolithic gyroscope comprising:
   a mounting post fixedly attached to a base and defining a first axis;
   a mass, including a generally flat layer of material having opposed major surfaces, fixedly attached to the post for vibrational movement and positioned in a plane perpendicular to the post, the mass defining second and third axes mutually perpendicular to each other and to the first axis;

a plurality of arms, each affixed at one end to the post and at another end to the mass, the arms mounting the mass generally uniformly disposed about the mounting post and in spaced relation thereto for vibrational movement;

driving apparatus mounted adjacent to the mass for causing the mass to move in a vibrational motion about the second axis; and sensing apparatus positioned adjacent to the mass for sensing movement about the third axis in response to movement of the gyroscope about the first axis.

2. A vibration monolithic gyroscope as claimed in claim 1 wherein the driving and sensing apparatus includes capacitive plates and driving and sensing circuitry connected to the capacitive plates, the driving and sensing circuitry being designed to time share the capacitive plates for both driving and sensing.

3. A vibration monolithic gyroscope as claimed in claim 2 wherein the driving and sensing apparatus further includes circuitry for sensing differential capacitance between selected ones of the capacitive plates during a first time period and applying an electrostatic force to the selected capacitive plates to center the mass during a second time period.

4. A vibration monolithic gyroscope as claimed in claim 2 wherein the driving and sensing apparatus further includes circuitry for applying an electrostatic force to selected capacitive plates to drive the mass in a first direction about the second axis and for sensing a first predetermined change of capacitance between selected ones of the capacitive plates and applying an electrostatic force to the selected capacitive plates to drive the mass in an opposite direction until a second predetermined change of capacitance is sensed.

5. A vibration monolithic gyroscope comprising:
a mounting post fixedly attached to a base and defining a first axis;
a mass positioned in a plane perpendicular to the post and spaced therefrom, the mass defining second and third axes mutually perpendicular to each other and to the first axis;
an arm affixed at one end to the post and at another end to the mass and mounting the mass for vibrational movement about the second axis;
driving apparatus mounted adjacent to the mass for causing the mass to move in a vibrational motion about the second axis; and
sensing apparatus positioned adjacent the mass for sensing movement about the third axis in response to movement of the gyroscope about the first axis.

6. A vibration monolithic gyroscope as claimed in claim 5 wherein the base is a semiconductor substrate with the post formed as an integral part thereof.

7. A vibration monolithic gyroscope as claimed in claim 5 wherein the mass, the arm and the mounting post are formed in a single polysilicon layer.

8. A vibration monolithic gyroscope as claimed in claim 5 wherein a portion of the driving apparatus and the sensing apparatus is formed on the substrate as a first polysilicon layer, the mass, the arm and the mounting post are formed as a second polysilicon layer and remaining portions of the driving apparatus and sensing apparatus are formed as a third layer.

9. A vibration monolithic gyroscope as claimed in claim 5 wherein the mass is generally uniformly disposed about the mounting post and in spaced relation thereto and a plurality of arms, each affixed at one end to the post and at another end to the mass, mount the mass for vibrational movement.

10. A vibration monolithic gyroscope as claimed in claim 5 wherein the mass is a generally flat layer of material having opposed major surfaces.

11. A vibration monolithic gyroscope as claimed in claim 10 wherein the driving and sensing apparatus include capacitive plates positioned parallel to and adjacent each major surface of the mass.

12. A vibration monolithic gyroscope as claimed in claim 11 wherein the driving and sensing apparatus further includes driving and sensing circuitry connected to the capacitive plates, the driving and sensing circuitry being designed to time share the capacitive plates for both driving and sensing.

13. A vibration monolithic gyroscope comprising:
a mounting post fixedly attached to a semiconductor substrate and forming an integral part therewith, the post defining a first axis;
a generally flat symmetrically shaped mass having a central opening therethrough and positioned symmetrically about the post, the mass being further positioned in a plane perpendicular to the post so as to define second and third axes mutually perpendicular to each other and to the first axis;
a plurality of arms affixed at one end to the post and at another end to the mass and mounting the mass for vibrational movement about the second axis;
driving plates mounted parallel to and adjacent the mass for causing the mass to move in a vibrational motion about the second axis; and
sensing plates positioned parallel to and adjacent the mass for sensing movement about the third axis in response to movement of the gyroscope about the first axis.

14. A method of operation of a vibration monolithic gyroscope including a mounting post fixedly attached to a base and defining a first axis, a mass fixedly attached to the post for vibrational movement and positioned in a plane perpendicular to the post, the mass defining second and third axes mutually perpendicular to each other and to the first axis, driving plates mounted adjacent to the mass for causing the mass to move in a vibrational motion about the second axis, and sensing plates positioned adjacent to the mass for sensing movement about the third axis in response to movement of the gyroscope about the first axis, the method of operation comprising the steps of:
vibrating the gyroscope about the second axis by applying an electrostatic force to the driving plates to drive the mass in a first direction about the second axis, sensing a first predetermined change of capacitance between the driving plates produced by movement of the mass in a first direction about the second axis and applying an electrostatic force to the driving plates to drive the mass in an opposite direction about the second axis until a second predetermined change of capacitance is sensed; and
sensing changes in differential capacitance between the sensing plates during a first time period, which changes represent movement of the gyroscope about the first axis, and applying an electrostatic force to the sensing plates to center the mass during a second time period.

15. A method of operation of a vibration monolithic gyroscope as claimed in claim 14 wherein the sensing and driving plates are the same plates and the vibrating and sensing steps are performed during different time periods.

* * * * *